Nov. 9, 1926.                                                                    1,606,470
R. F. GRANT ET AL
PROCESS FOR OXIDIZING A FERROUS SALT
Filed March 9, 1925 ird F. Grant
Herbert E. Wetherbee
        INVENTORS

ATTORNEY.

Patented Nov. 9, 1926.                                                              1,606,470

UNITED STATES PATENT OFFICE.

RICHARD F. GRANT AND HERBERT E. WETHERBEE, OF CLEVELAND, OHIO, ASSIGNORS OF ONE-THIRD TO HOWARD M. HANNA, OF CLEVELAND, OHIO.

PROCESS FOR OXIDIZING A FERROUS SALT.

Application filed March 9, 1925. Serial No. 14,053.

Our invention relates to improvements in catalytic oxidation process, and has for its object a procedure for oxidizing ferrous salt by means of air in presence of a suitable, solid, catalytic substance.

Such reactions depend, as is well known, on continuous and effective contact between the substances undergoing chemical combination and the catalytic material and are greatly accelerated if the catalytic material is so subdivided as to present a large contact surface. Accordingly, the procedure devised by us is based upon the treatment of a fluid body wherein the catalytic material, in subdivided form, is maintained in suspension or in rapid and continuous contact with fresh portions of the fluid body by suitable agitation of the fluid and the use of air under pressure in such manner as to insure the subdivision of the air in small bubbles throughout the fluid. By our procedure the conditions above outlined are fulfilled and the catalytic surface is maintained in an active form and any fine material formed by abrasion of the catalyzer remains effective.

Figure 1:
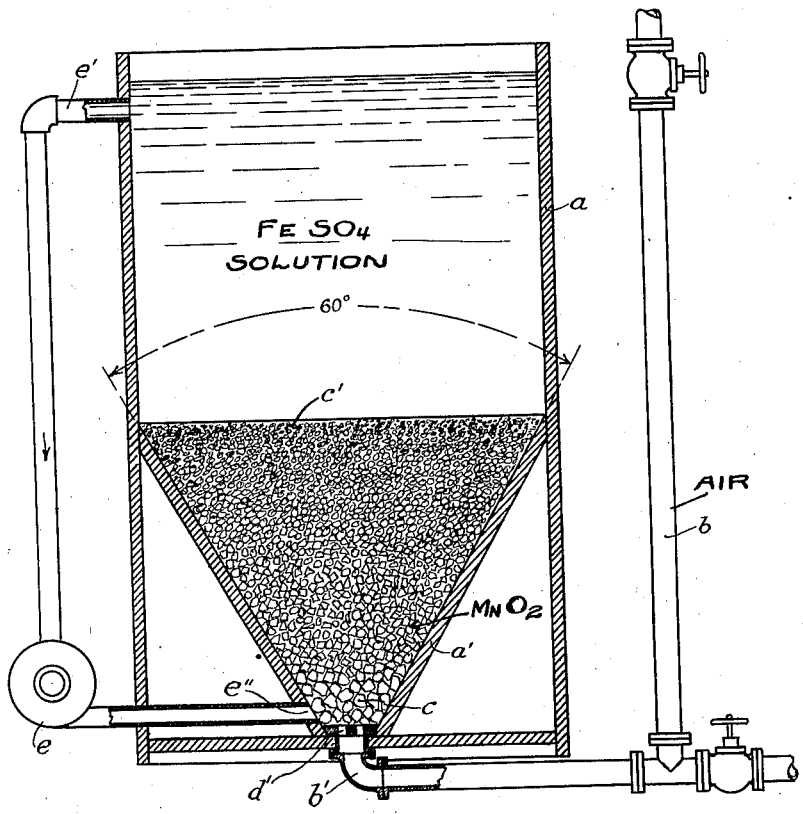
Figure 2:
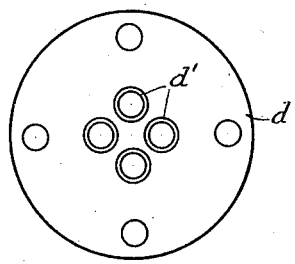

We may explain the procedure and theory of our improvement by making reference to the accompanying drawing wherein Fig. 1 is a vertical, sectional view on a median line, somewhat diagrammatically disclosing the apparatus adapted for practicing our improvement and Fig. 2 is an enlarged plan view of the lead gasket member preferably provided at the bottom of the conical tank through which a gas under pressure is introduced in sub-divided form.

Throughout the figures of the drawing we have employed the same character of reference to indicate similar parts.

We have selected as a typical procedure conforming to our invention the oxidation of ferrous sulphate to form ferric sulphate which is an important step in the well known leaching process for recovering the values of copper ores. In these reactions the copper goes into solution as copper sulphate, $CuSO_4$, and ferric sulphate, $Fe_2(SO_4)_3$, is reduced to ferrous sulphate, $FeSO_4$.

Thus it is necessary to oxidize the ferrous sulphate to continue the leaching cycle. Theoretically, it should be possible to oxidize ferrous to ferric sulphate merely by subjecting it to the action of the air but in practice this method of oxidation is found to be extremely inefficient and impractical for commercial operation. We believe that the prime reason for this is the fact that only the oxygen from the air which is actually dissolved in a solution is effective for oxidation and accordingly it is desirable to sub-divide the air as much as possible and cause it to rise through a considerable column of liquid for the purpose of dissolving the maximum amount of oxygen.

However, it is found that a suitable catalytic agent is practically essential for effecting the oxidation by air of ferrous sulphate to ferric sulphate. Pyrolusite or impure manganese dioxide, psilomelane usually being present with the pyrolusite, constitute a very satisfactory catalyzer when used in this connection especially so when it is so finely subdivided as to present a very large exposed surface, as compared with its weight. Accordingly, our process contemplates the use of pyrolusite preferably in subdivided form.

In the drawing we have somewhat diagrammatically illustrated a tank $a$ having a conical, lower portion $a'$ connected with a controlled air suppy $b$ under pressure. At the bottom of the treating tank there is provided a body of broken pyrolusite $c$ surmounted by additional layers of pyrolusite reduced to smaller and smaller dimensions; that in the upper portion taking the form of granular material and finally a powder $c'$ at the top.

The air connection at the bottom is made through the perforated lead gasket $d$ having openings $d'$ connecting with elbow $b'$ whereby the incoming air is broken up into small bubbles for insuring better contact with the catalyzer and fluid. It will be understood that the tank, pipes and connections are lead lined in order to resist the normal acid content.

Assuming that the tank is filled with a volume of ferrous sulphate solution to which the required amount of sulphuric acid has been added, air under pressure is turned on from $b$ and flows through the openings $d'$ upwardly through the subdivided pyrolusite causing more or less violent agitation thereof and of the fluid contents of the tank. This agitation causes rapid and continued contact between the air, the fluid body and the catalytic material and in addition holds the granular and finer portions of the pyrolusite in suspension and maintains the catalytic surface in active condition.

Under these conditions the air is rapidly subdivided into minute bubbles which rise through the body of the fluid insuring intimate contact and rapid solution of the oxygen of the air and, under the influence of the catalytic material, rapid oxidation of the ferrous sulphate to ferric sulphate takes place.

It is apparent that the desired oxidation from ferrous sulphate to ferric sulphate will take place under the conditions herein described whether or not sulphuric acid is added. However, if complete oxidation of the entire ferrous sulphate content is desired, it will be understood that the addition of the required amount of sulphuric acid will accomplish this result. Furthermore, it is apparent that some excess of acid in the solution is desirable to further the desired reaction and prevent the formation of any basic salts in said solution.

The catalytic action is pronounced when the surfaces of the pyrolusite are fresh and have not been exposed to the action of the ferrous sulphate solution. On repeated oxidations with the same batch of pyrolusite, the chemical reaction of oxidation by the pyrolusite becomes more pronounced and results in a noticeable loss of manganese which goes into solution as manganous sulphate. The amount of manganese that goes into solution is variable, which may be due to decomposition of the surface of the pyrolusite under exposure to the ferrous sulphate solution in the presence of air.

Our results indicate that the rate of oxidation is approximately proportional to the catalytic surfaces exposed, and, as is self-evident, these surfaces are enormously increased by providing or producing the finer sizes of the pyrolusite or other catalyzing material that may be used. These finer sizes, moreover, result through the natural operation of the air introduced under pressure at the bottom of the column of subdivided catalytic material and fluid, whereby a maximum suspension of said material is insured and in finely sub-divided form.

When oxidation is completed the air is shut off and the solution allowed to settle for a few minutes, after which such solution is drawn off to settling tanks; the pyrolusite in the bottom of the oxidation tank forming its own filter bed. Obviously this procedure may be followed with advantage by using other catalyzing agents and different chemical groups, but the process is sufficiently explained to exemplify our improvements.

While we have described the agitation of the fluid body and the attrition of the catalyzing agent by means of air under pressure, it is apparent that additional agitating means may be employed, as for example, a rotary pump $e$, which is connected to withdraw the solution from an upper portion $e'$ of the tank and inject it under pressure at a lower portion $e''$ thereof, concurrently with the introduction of air, so that the fluid is bodily circulated in intimate contact with the catalyzing agent and the desired chemical reaction results as before.

Having now described the means for practicing our invention and the preferred procedure and theory thereof, as understood, we claim as new and desire to secure by Letters Patent, the following:

1. The herein described process for oxidizing a ferrous salt, which consists in introducing subdivided manganese dioxide to a fluid body of the ferrous salt, subjecting said fluid to the action of air, and inducing circulation of said fluid body in contacting relation with the manganese dioxide.

2. The herein described process for oxidizing a ferrous salt, which consists in introducing a quantity of sub-divided pyrolusite to a fluid body of the ferrous salt, and subjecting said fluid to the action of air under pressure.

3. The herein described process for oxidizing a ferrous salt, which consists in introducing sub-divided pyrolusite to a fluid body of the ferrous salt, causing the attrition of the pyrolusite and subjecting the fluid to the action of air.

4. The herein described process for oxidizing a ferrous salt, which consists in introducing a subdivided solid catalyzer to a fluid body of the ferrous salt, and circulating said fluid in contact with the catalyzer in the presence of air.

5. The herein described process for oxidizing a ferrous salt, which consists in introducing a subdivided solid catalyzer to a fluid body of the ferrous salt, adding an excess of acid, and circulating said fluid in the presence of air.

6. The herein described process for oxidizing a ferrous salt, which consists in introducing a quantity of subdivided manganese dioxide to an acid solution of the ferrous salt, and circulating said fluid in contact therewith in the presence of air.

7. The herein described process for oxidizing a ferrous salt, which consists in introducing coarsely and finely subdivided pyrolusite to a fluid body of the ferrous salt, and subjecting such catalytic material and fluid to the action of air under pressure.

In testimony whereof we do now affix our signatures.

RICHARD F. GRANT.
HERBERT E. WETHERBEE.